United States Patent
Dahiya et al.

(10) Patent No.: US 10,045,366 B2
(45) Date of Patent: Aug. 7, 2018

(54) SCHEDULER FOR LAYER MAPPED CODE WORDS

(71) Applicant: FREESCALE SEMICONDUCTOR, INC., Austin, TX (US)

(72) Inventors: Somvir Dahiya, Bangalore (IN); Arvind Kaushik, Ghaziabad (IN); Aviel Livay, Givataim (IL); Amrit P. Singh, Ludhiana (IN)

(73) Assignee: NXP USA, INC., Austin, TX (US)

( * ) Notice: Subject to any disclaimer, the term of this patent is extended or adjusted under 35 U.S.C. 154(b) by 290 days.

(21) Appl. No.: 15/213,364

(22) Filed: Jul. 18, 2016

(65) Prior Publication Data
US 2018/0020468 A1    Jan. 18, 2018

(51) Int. Cl.
*H04W 72/12*    (2009.01)
*H04L 25/05*    (2006.01)

(52) U.S. Cl.
CPC ......... *H04W 72/1263* (2013.01); *H04L 25/05* (2013.01)

(58) Field of Classification Search
CPC .......................... H04W 72/1263; H04L 25/05
USPC ........................................................ 370/329
See application file for complete search history.

(56) References Cited

U.S. PATENT DOCUMENTS

| | | | |
|---|---|---|---|
| 6,563,884 B1 * | 5/2003 | Nikula | H04L 1/0084 375/225 |
| 8,391,429 B2 | 3/2013 | Mergen et al. | |
| 8,630,379 B1 | 1/2014 | Sun et al. | |
| 8,830,863 B2 | 9/2014 | Novak et al. | |
| 2013/0028223 A1 | 1/2013 | Kim et al. | |
| 2014/0036859 A1 | 2/2014 | Ekpenyong et al. | |

* cited by examiner

*Primary Examiner* — Natasha W Cosme
(74) *Attorney, Agent, or Firm* — Charles E. Bergere

(57) ABSTRACT

An eNode-B includes PUSH mapping hardware for improved performance. A scheduler schedules first and second code words of first and second respective user devices. A buffer receives and stores first and second identifiers. A de-multiplexer outputs a first code word number based on the first identifier and a second code word number based on the second identifier. A set of completion queues store the first and second code word numbers. A sequence controller generates first and second select signals corresponding to the first and second identifiers. A multiplexer outputs one of the first and second code word numbers based on the select signals, and the scheduler schedules the first and second code words based on the first and second identifiers.

12 Claims, 2 Drawing Sheets

SCHEDULER FOR LAYER MAPPED CODE WORDS

BACKGROUND

The present invention relates generally to communication systems, and, more particularly, to a baseband system-on-chip (SoC) in a base station of a communication system.

A general packet radio service (GPRS) communication system includes a server GPRS support node (SGSN), a gateway GPRS support node (GGSN), a mobile switching center (MSC), location registers, a radio network controller (RNC), NodeB, and user equipment (UE). The NodeB facilitates communication between the UEs and the SGSN by way of a radio access network (RAN). The terms SGSN, GGSN, and NodeB are technology standard-specific, and in this case are used in context of the third generation (3G) communication standard for wireless cellular communication. For example, a NodeB in the 3G communication standard corresponds to an Evolved Node B (eNodeB) in the fourth generation (4G) communication standard. The 4G communication standard is also referred to as long-term evolution (LTE) or long-term evolution-advanced (LTE-A) standards.

In the LTE and LTE-A standards, an evolved universal terrestrial radio access network (E-UTRAN) includes multiple UEs in communication with multiple eNodeBs. Examples of UEs include hand-held devices such as cellular phones, tablets, pads, personal digital assistants (PDAs), and laptops with a mobile broadband adapter. An eNodeB and a UE communicate by way of uplink and downlink communication channels. The uplink communication channels include physical uplink channels, transport uplink channels, and logical uplink channels. The physical uplink channels include a physical uplink control channel (PUCCH), a physical uplink shared channel (PUSCH), and a physical random access channel (PRACH).

The UE transmits user and control data to the eNodeB over the PUSCH. The control data includes channel quality indicators (CQI), a multiple-input and multiple-output (MIMO) feedback, hybrid automatic repeat requests (HARQ ACK/NACK), and scheduling requests. As the E-UTRAN includes multiple UEs communicating with at least one eNodeB, the eNodeB allocates resource blocks to the multiple UEs for the uplink transmission of user and control data.

One way to implement uplink transmission of the user and control data from the UEs is to use a multi-user multiple-input and multiple-output (MU-MIMO) system. The UEs transmit their user and control data to the eNodeB over the PUSCH as code words. A command submission for a UE is complete when the code words for that UE are received by the eNodeB. In MU-MIMO systems, each UE is allocated a layer, which is a group of carrier frequencies and a spatial matrix. The spatial matrix corresponds to various antenna configurations used by the UE to transmit the code words to the eNodeB. The UE transmits the code words to the eNodeB over the layer. The PUSCH includes multiple such layers over which the UEs transmit their code words. Thus, the UEs share the bandwidth allocated for the uplink communication by the eNodeB.

Generally, the eNodeB receives the user and control data in a random sequence. The user and control data of adjacent physical uplink transmission layers can interfere with each other, resulting in corruption of the data. Thus, the eNodeB performs signal restoration operations on the received data using mean-square error (MSE) and successive interference cancellation (SIC) algorithms.

Typically, the eNodeB includes a baseband system-on-a chip (SoC) that receives the user and control data transmitted by the UEs roaming within multiple radio cells. The baseband SoC includes a hardware accelerator that performs the signal restoration operations. The hardware accelerator receives the code words from the UEs and performs PUSCH layer mapping operations on the code words to generate mapped code words. The mapped code words are also processed using software, which performs the signal restoration operations using the mapped code words on a per radio cell basis. However, the software does not receive the mapped code words on a per radio cell basis. As a result, latency is introduced in the signal restoration operations.

To ensure efficient execution of the signal restoration operations, the software should receive the mapped code words on a per radio cell basis i.e., the mapped code words are grouped based on their corresponding radio cells. Further, the sequence in which the groups of mapped code words are provided to the software should be defined.

One known technique to generate the groups of mapped code words based on the radio cells is to perform the PUSCH layer mapping operations on the code words on a per radio cell basis. In this technique, a layer mapper maps the code words to the corresponding layers based on the corresponding radio cells, i.e., the code words of a second radio cell are mapped only after the code words of a first radio cell are mapped. Thus, the PUSCH layer mapping operations are performed on groups of code words based on the radio cells to generate corresponding groups of mapped code words. Then the software receives the groups of mapped code words and executes the signal restoration operations on a per radio cell basis. However, as the code words received from the second radio cell are queued until the code words from the first radio cell are mapped, latency is introduced in the PUSCH layer mapping operations and consequently in the signal restoration operations.

It would be advantageous to have a scheduler that reduces the latency in the execution of the signal restoration operations performed in the baseband SoC.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
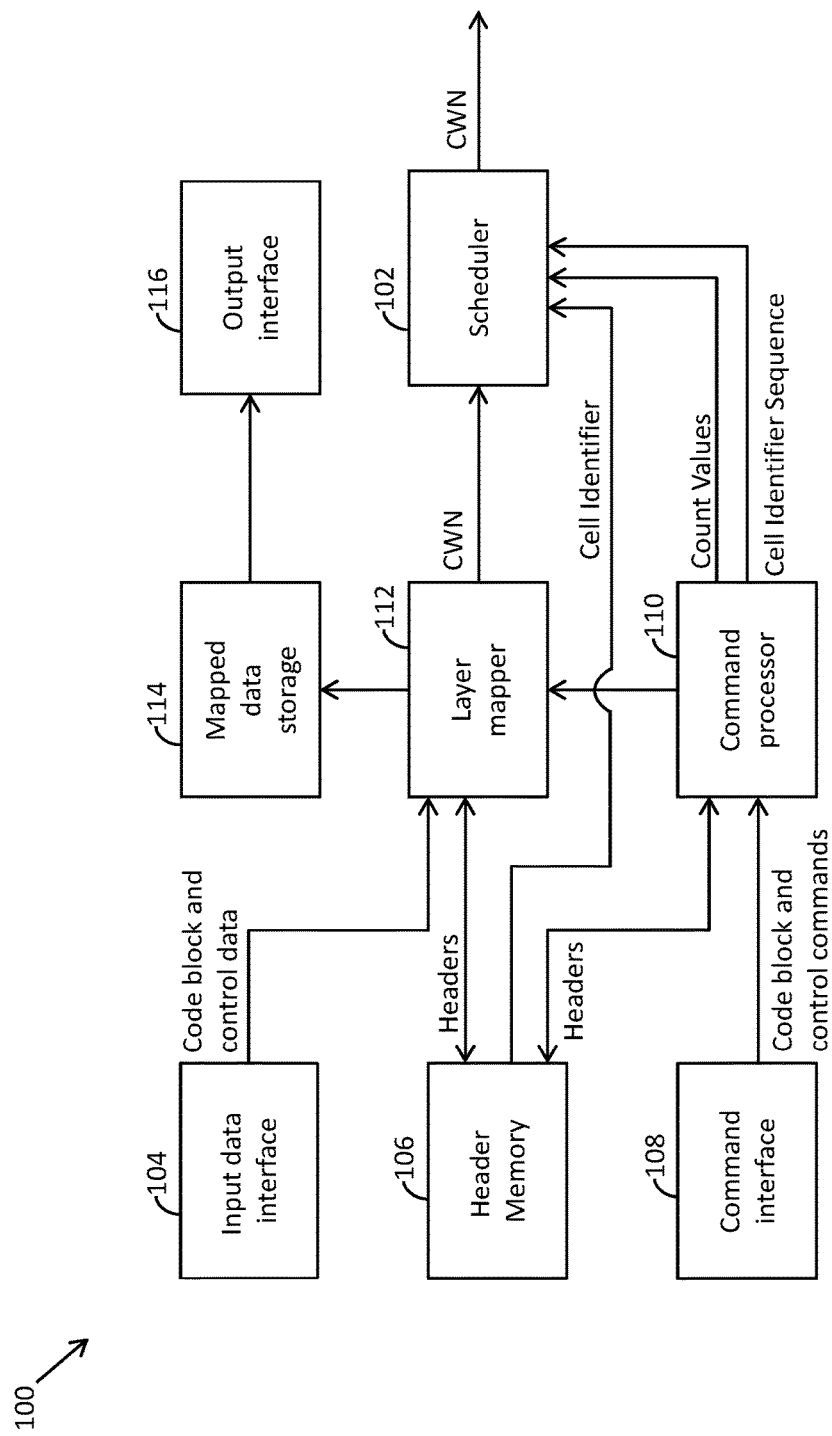
FIG. 1 is a schematic block diagram of a baseband system-on-chip (SoC) in a radio base station in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a scheduler that schedules first and second code words corresponding to first and second user devices, respectively. The first code word includes a first identifier and a first code word number and the second code word includes a second identifier and a second code word number. The scheduler comprises a buffer memory, a de-multiplexer, a set of completion queues, a sequence controller, and a multiplexer. The buffer memory is connected to a command processor for receiving and storing the first and second identifiers. The de-multiplexer is connected to a layer mapper for receiving the first and second code word numbers and a header memory for receiving the first and second identifiers. The de-multiplexer outputs the first code word number based on the first identifier and the second code word number based on the second identifier. The set of completion queues includes first and second completion queues corresponding to the first and second identifiers, respectively. The first completion queue stores the first code word number, and the second completion queue stores the second code word number. The sequence controller is connected to the buffer memory for receiving the first and second identifiers. The sequence controller generates first and second select signals corresponding to the first and second identifiers, respectively. The multiplexer is connected to the sequence controller for receiving the first and second select signals and the set of completion queues for receiving the first and second code word numbers. The multiplexer outputs one of the first and second code word numbers based on the first and second select signals. The scheduler schedules the first and second code words based on the first and second identifiers.

In another embodiment, the present invention provides a radio base station that manages first and second radio cells including first and second user devices. The radio base station schedules first and second code words of the first and second user devices, respectively. The first code word includes a first identifier and a first code word number, while the second code word includes a second identifier and a second code word number. The radio base station comprises a command processor, a layer mapper, a header memory, and a scheduler. The command processor receives first and second code block commands of the first and second code words, and outputs the first and second identifiers. The layer mapper receives a plurality of code block commands and a plurality of control commands of the first code word, and a plurality code block commands and a plurality control commands of the second code word. The layer mapper outputs the first and second code word numbers. The layer mapper outputs the first code word number when a plurality of code block commands and a plurality of control commands of the first code word are received, processed, and stored in a mapped data storage. The layer mapper outputs the second code word number when a plurality of code block commands and a plurality of control commands of the second code word are received, processed, and stored in the mapped data storage. The header memory receives and stores headers of the first and second code words. The header of the first code word includes the first code word number and the first identifier, while the he header of the second code word includes the second code word number and the second identifier. The scheduler is connected to the command processor, the layer mapper, and the header memory, and schedules the first and second code words. The scheduler includes a buffer memory, a de-multiplexer, a set of completion queues, a sequence controller, and a multiplexer. The buffer memory receives and stores the first and second identifiers from the command processor. The de-multiplexer receives the first and second code word numbers from the layer mapper and the first and second identifiers from the header memory, and outputs the first code word number based on the first identifier and the second code word number based on the second identifier. The set of completion queues includes first and second completion queues corresponding to the first and second identifiers, respectively. The set of completion queues is connected to the de-multiplexer for receiving and storing the first and second code word numbers. The first completion queue stores the first code word number, and the second completion queue stores the second code word number. The sequence controller is connected to the buffer memory for receiving the first and second identifiers. The sequence controller generates first and second select signals corresponding to the first and second identifiers, respectively. The multiplexer is connected to the sequence controller for receiving the first and second select signals, and to the set of completion queues for receiving the first and second code word numbers. The multiplexer outputs one of the first and second code word numbers based on the first and second select signals. The scheduler schedules the first and second code words based on the multiplexer output.

Various embodiments of the present invention provide a scheduler for scheduling first and second code words corresponding to first and second user devices, respectively. The scheduler includes a buffer memory, a de-multiplexer, a set of completion queues, a sequence controller, and a multiplexer. The buffer memory receives and stores first and second identifiers. The de-multiplexer outputs first code word number based on the first identifier and second code word number based on the second identifier. The set of completion queues includes first and second completion queues corresponding to the first and second identifiers, respectively. The first completion queue stores the first code word number and the second completion queue stores the second code word number. The sequence controller generates first and second select signals corresponding to the first and second identifiers, respectively. The multiplexer outputs at least one of the first and second code word numbers based on the first and second select signals. The scheduler schedules the first and second code words based on the first and second identifiers.

The scheduler reduces latency in signal restoration operations by grouping and scheduling the mapped code words based on identifiers of the radio cells. Further, the layer mapper does not have to perform the layer mapping operations on a per radio cell basis. The layer mapper performs the layer mapping operations on the code words in the sequence in which the corresponding code block commands are received by the radio base station, thereby avoiding delay in the layer mapping operations of the code words.

Referring now to FIG. 1, a schematic block diagram of a baseband system-on-chip (SoC) 100 in accordance with an embodiment of the present invention is shown. The baseband SoC 100 is included in a radio base station. According to the third generation (3G) standard, the radio base station is referred to as Node B and the fourth generation (4G) standard as Evolved Node B (eNodeB). For simplicity, Node B and eNodeB will be collectively referred to as a radio base station.

The radio base station communicates with multiple UEs, which correspond to multiple users, over a radio network that includes uplink and downlink channels. The uplink channel includes a physical uplink channel, a logical uplink channel, and a transport uplink channel. The physical uplink channel includes a physical uplink shared channel (PUSCH). The multiple UEs transmit code words to the radio base station over the PUSCH. The code words include user and control data of the multiple UEs. The PUSCH includes multiple physical uplink transmission layers over which the multiple UEs transmit the corresponding multiple code words. Thus, the multiple UEs share the bandwidth allocated for the uplink communication by the radio base station.

As discussed above, the user and control data of the multiple UEs, transmitted on adjacent carrier frequencies, interfere with each other. Thus, the radio base station may receive corrupted user and control data. To reconstruct and retrieve the user and control data, the baseband SoC 100 performs signal restoration and reconstruction operations on the code words received from the UEs.

In one embodiment, the radio base station assigns code word numbers to each UE of the multiple UEs. Thus, the UEs are identified by their corresponding code word numbers at the radio base station. Further, each radio cell of the multiple radio cells has a corresponding cell identifier. The radio cells are identified by their corresponding cell identifiers at the radio base station. A header of a code word includes a code word number and a cell identifier. The baseband SoC 100 identifies the UE and the radio cell to which the UE belongs based on the header of the code word.

The code word headers received from one radio cell include the same cell identifier. The code word of the UE also includes a code block command, a control command, code block data and control data. The code block data and the control data correspond to the code block and control command, respectively. A command submission for the UE is complete when the radio base station receives the code block command, the control command, the code block data, and the control data corresponding to the UE. In one embodiment, the code word of the UE may include multiple code block commands and multiple control commands. The command submission for the UE is complete when the radio base station receives the code block commands, the control commands, the code block data, and the control data corresponding to the UE.

The baseband SoC 100 includes a scheduler 102, an input data interface 104, a header memory 106, a command interface 108, a command processor 110, a layer mapper 112, a mapped data storage 114, and an output interface 116.

The command interface 108 receives the code block commands and the control commands from the UEs. Typically, each of the code block commands and control commands include multiple data fields such as the code word number, a command type, command size, and command status. The command types include a code block command and a control command. The command size indicates the size of the respective code block command or the control command. Further, since the control commands and the code block commands are received for each UE, the command status indicates whether the corresponding command is the last command of multiple code block and control commands.

The input data interface 104 receives the code block data and the control data corresponding to the code block commands and the control commands, respectively, from the UEs. The header memory 106 stores the headers of the code words received from the corresponding multiple UEs.

The command processor 110 is connected to the header memory 106 and the command interface 108. The command processor 110 receives the code block commands and the control commands corresponding to the UEs from the command interface 108. The command processor 110 also receives the code block commands. A command submission sequence is the sequence in which the code block commands are received. When the command processor 110 receives the code block commands, it requests the header memory 106 for the headers corresponding to the code block commands. The command processor 110 generates a cell identifier sequence, based on the received code block commands and the corresponding headers. The cell identifier sequence includes a sequence of the cell identifiers that based on the command submission sequence. The command processor 110 calculates multiple count values indicating the number of code block commands received from the corresponding multiple radio cells. The command processor 110 arranges the cell identifiers in at least one of a first-in-first-out (FIFO) order, a last-in-first-out (LIFO) order, a cell priority-based order, and a UE priority-based order in the cell identifier sequence.

The layer mapper 112 is connected to the command processor 110 to receive the code block commands and the control commands of the corresponding code words. The layer mapper 112 also is connected to the input data interface 104 to receive the code block data and the control data corresponding to the code words. The layer mapper 112 also is connected to the header memory 106 to receive the headers of the corresponding code words. The layer mapper 112 receives the code word numbers and the cell identifiers corresponding to the code words, and maps the code block and control data, and the control block and control commands to corresponding layers of the PUSCH and generates corresponding mapped code words. A layer is a group of carrier frequencies and a spatial matrix. The spatial matrix corresponds to various antenna configurations used by the UE to transmit the code words to the radio base station. When the code block and control commands corresponding to the code words are received, the layer mapper 112 outputs the corresponding code word numbers. The layer mapper 112 is also referred to as PUSCH mapping hardware.

The mapped data storage 114 is connected to the layer mapper 112 to receive and store the mapped code words. The output interface 116 is connected to the mapped data storage 114 to receive and output the mapped code words.

The scheduler 102 is connected to the layer mapper 112 to receive the code word numbers of the corresponding mapped code words. Further, the scheduler 102 is connected to the command processor 110 to receive the cell identifier sequence and the multiple count values of the corresponding multiple radio cells. The scheduler 102 generates multiple scheduling signals based on the cell identifier sequence and the multiple count values. The multiple scheduling signals are the code word numbers of the mapped code words.

Figure 2:
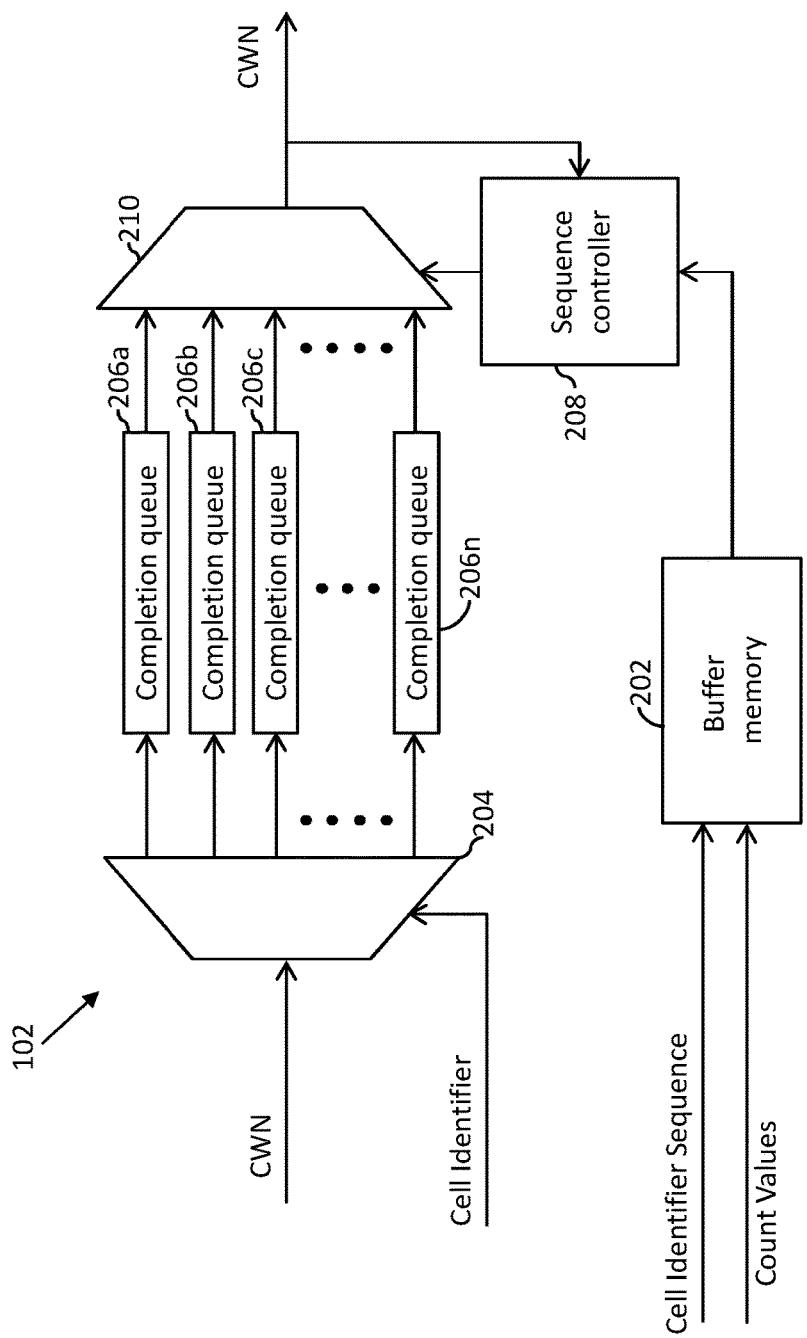
FIG. 2 is a schematic block diagram of a scheduler of the baseband SoC of FIG. 1 in accordance with an embodiment of the present invention.

Referring now to FIG. 2, a schematic block diagram of the scheduler 102 in accordance with an embodiment of the present invention is shown. The scheduler 102 includes a buffer memory 202, a de-multiplexer 204, a set of completion queues 206—three of which are shown 206a-206c, a sequence controller 208, and a multiplexer 210. The scheduler 102 generates the multiple scheduling signals that schedule the mapped code words. A scheduling signal of the multiple scheduling signals is a code word number of a mapped code word.

The buffer memory 202 is connected to the command processor 110 to receive the cell identifier sequence and the multiple count values. In a presently preferred embodiment, the buffer memory 202 is a FIFO memory. Each cell identifier of the cell identifier sequence has a corresponding count value.

The de-multiplexer 204 is connected to the layer mapper 112 to receive the code word numbers of the corresponding mapped code words. The de-multiplexer 204 also is connected to the header memory 106 to receive the cell identifiers corresponding to the mapped code words. The cell identifier is a select signal for the de-multiplexer 204.

The set of completion queues 206 is connected to the de-multiplexer 204 to receive the code word numbers corresponding to the mapped code words. A completion queue of the set of completion queues 206 is a FIFO memory and corresponds to the cell identifier. In one embodiment, the scheduler 102 in the radio base station, which communicates with four (for example) radio cells, includes a set of four completion queues. Each radio cell in the four radio cells has a corresponding completion queue in the set of four completion queues. The set of completion queues 206 stores the code word numbers of the corresponding mapped code words.

The sequence controller 208 is connected to the buffer memory 202 to receive the cell identifier sequence and the multiple count values. The sequence controller 208 generates multiple control signals corresponding to the cell identifiers of the cell identifier sequence based on the multiple count values. In one embodiment, the cell identifier sequence includes first and second cell identifiers. The first and second cell identifiers have first and second count values, respectively. The sequence controller 208 generates a first control signal corresponding to the first cell identifier and continues to output the first control signal till the first count value equals zero. Subsequently, the sequence controller 208 generates a second control signal and continues to output the control signal until the second count value equals zero.

The multiplexer 210 is connected to the set of completion queues 206, and to the sequence controller 208 to receive the multiple control signals. The multiplexer 210 selects a completion queue of the set of completion queues 206, based on a control signal of the multiple control signals, and fetches the code word numbers from the selected completion queue. Thus, the multiplexer 210 schedules the code word numbers based on the cell identifier sequence. The multiplexer 210 outputs the code word numbers stored in the completion queue of the set of completion queues 206. The code word number output by the multiplexer 210 is also referred to as a scheduling signal. The sequence controller 208 receives the multiple scheduling signals and modifies the count values based on the multiple scheduling signals.

In operation, the radio base station communicates with first through third radio cells. The radio base station assigns first through third cell identifiers to the first through third radio cells, respectively. The first through third radio cells include first through sixth UEs. The first through sixth UEs transmit first through sixth code words to the radio base station. The first and second UEs belong to the first radio cell, and have first and second code word numbers, respectively. The third and fourth UEs belong to the second radio cell, and have third and fourth code word numbers, respectively. The fifth and sixth UEs belong to the third radio cell, and have fifth and sixth code word numbers, respectively. The scheduler 102 includes the first through third completion queues 206a-206c corresponding to the first through third cell identifiers, respectively. It will be apparent to a person skilled in the art that the radio base station may communicate with multiple UEs roaming in multiple radio cells. The radio base station may also receive code word numbers from other radio base stations and generate the scheduling signals.

Each code word includes one code block command and one control command. The first through sixth code words include first through sixth code block commands, and first through sixth control commands, respectively. Each of the first through sixth code block commands and the first through sixth control commands may arrive either separately or after each other. The radio base station completes the command submission of the first through sixth UEs when the first through sixth code block commands and the first through sixth control commands are received. The radio base station receives the first through sixth code block commands in a command submission sequence. In one example, the command submission sequence received by the command processor 110 is: the fourth code block command, the sixth code block command, the second code block command, the first code block command, the fifth code block command, and the third code block command; and a header of the fourth code block command includes the fourth code word number and the second cell identifier. A header of the sixth code block command includes the sixth code word number and the third cell identifier. A header of the second code block command includes the second code word number and the first cell identifier. A header of the first code block command includes the first code word number and the first cell identifier. A header of the fifth code block command includes the fifth code word number and the third cell identifier. Finally, a header of the third code block command includes the third code word number and the second cell identifier.

The command processor 110 receives the command submission sequence and generates the cell identifier sequence and first through third count values corresponding to the first through third cell identifiers, respectively. The buffer memory 202 receives and stores the cell identifier sequence and the first through third count values. In one example, the following is the cell identifier sequence for the command submission sequence—the second cell identifier, the third cell identifier, and the first cell identifier. The first through third count values of the first through third cell identifiers, respectively, are each two. The layer mapper 112 processes the first through sixth code words in the order of the command submission sequence.

The layer mapper 112 outputs the fourth code word number when it receives and maps the fourth code word. The de-multiplexer 204 receives the fourth code word number and the second cell identifier, and stores the fourth code word number in the second completion queue 206b, which corresponds to the second cell identifier, which is the select signal of the de-multiplexer 204. Similarly, the de-multiplexer 204 stores the sixth code word number in the third completion queue 206c, the second code word number in the first completion queue 206a, the first code word number in the first completion queue 206a, the fifth code word number in the third completion queue 206c, and the third code word number in the second completion queue 206b.

The sequence controller 208 fetches the cell identifier sequence and the first through third count values from the buffer memory 202. The sequence controller 208 controls the scheduling signals based on the cell identifier sequence and the first through third count values. The sequence controller 208 provides the second cell identifier to the multiplexer 210. The multiplexer 210 selects the second completion queue 206b based on the second cell identifier and outputs the fourth code word number as a first scheduling signal. Then the second count value is decremented to one. Next, the multiplexer 210 outputs the third code word number as a second scheduling signal. Then the second count value is decremented to zero. Thus, the code word numbers corresponding to the second cell identifier are output first as per the cell identifier sequence.

After the generation of the first and second scheduling signals corresponding to the second cell identifier, the sequence controller 208 selects the third cell identifier. The multiplexer 210 selects the third completion queue 206c and outputs the sixth and fifth code word numbers as third and fourth scheduling signals, respectively. Finally, the multiplexer 210 selects the first completion queue 206a and outputs the second and the first code word numbers as fifth and sixth scheduling signals, respectively.

In another embodiment of the present invention, since the code word numbers are stored in the completion queues 206 after completion of the command submission of the corresponding UE, the sequence of the code word numbers stored in the completion queues 206 may be different from that of the command submission sequence. For example, in the case of the aforementioned command submission sequence, if the command submission of the first code word is completed before the command submission of the second code word, the multiplexer 210 outputs the first and the second code word numbers as the fifth and sixth scheduling signals.

The first through sixth scheduling signals generated for the second cell identifier, the third cell identifier, and the first cell identifier are either an input or an interrupt to a hardware accelerator that performs the successive interference cancellation operations and signal restoration operations.

Thus, the scheduler 102 generates the first through sixth scheduling signals that schedule the mapped code words based on the radio cells or cell identifiers. The scheduling of the code word numbers according to the radio cells is essential to ensure efficiency in the successive interference cancellation operations and the signal restoration operations in the radio base station.

While the scheduler 102 performs the scheduling operations, the baseband SoC 100 can perform other critical functions in the physical layer (L1). Further, the complexities in the L1 software are reduced.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A scheduler for scheduling first and second code words corresponding to first and second user devices, respectively, wherein the first code word includes a first identifier and a first code word number and the second code word includes a second identifier and a second code word number, the scheduler comprising:
   a buffer memory connected to a command processor for receiving and storing the first and second identifiers;
   a de-multiplexer connected to a layer mapper for receiving the first and second code word numbers, and a header memory for receiving the first and second identifiers, and outputting the first code word number based on the first identifier and the second code word number based on the second identifier;
   a set of completion queues, including first and second completion queues corresponding to the first and second identifiers, respectively, connected to the de-multiplexer for receiving and storing the first and second code word numbers, wherein the first completion queue stores the first code word number, and the second completion queue stores the second code word number;
   a sequence controller connected to the buffer memory for receiving the first and second identifiers, and generating first and second select signals corresponding to the first and second identifiers, respectively; and
   a multiplexer connected to the sequence controller for receiving the first and second select signals, and the set of completion queues for receiving the first and second code word numbers, and outputting one of the first and second code word numbers based on the first and second select signals, wherein the scheduler schedules the first and second code words based on the first and second identifiers.

2. The scheduler of claim 1, wherein the first and second user devices correspond to first and second radio cells, respectively, and the first and second identifiers correspond to the first and second radio cells, respectively.

3. The scheduler of claim 1, wherein a header of the first code word includes the first code word number and the first identifier, and a header of the second code word includes the second code word number and the second identifier.

4. The scheduler of claim 1, wherein the first completion queue stores the first code word number when the layer mapper receives a plurality of code block commands and a plurality of control commands of the first code word, processes the plurality of code block commands and the plurality of control commands, and stores the plurality of code block commands and the plurality of control commands in a mapped data storage.

5. The scheduler of claim 4, wherein the second completion queue stores the second code word number when the layer mapper receives a plurality of code block commands and a plurality of control commands of the second code word, processes the plurality of code block commands and the plurality of control commands, and stores the plurality of code block commands and the plurality of control commands in the mapped data storage.

6. The scheduler of claim 1, wherein the first completion queue, the second completion queue, and the buffer memory each are first-in-first-out (FIFO) memories.

7. The scheduler of claim 1, wherein the sequence controller is connected to the multiplexer for receiving the one of the first and second code word numbers, and determines first and second count values of the first and second code word numbers, respectively.

8. The scheduler of claim 7, wherein the sequence controller outputs one of the first and second select signals based on the first and second count values.

9. A radio base station that manages first and second radio cells including first and second user devices, respectively, wherein the radio base station schedules first and second code words corresponding to the first and second user devices, respectively, wherein the first code word includes a first identifier and a first code word number and the second code word includes a second identifier and a second code word number, the radio base station comprising:
   a command processor that receives first and second code block commands of the first and second code words, respectively, and outputs the first and second identifiers;
   a layer mapper that receives a plurality of code block commands and a plurality of control commands of the first code word, and a plurality code block commands and a plurality control commands of the second code word, and outputs the first and second code word numbers, wherein the layer mapper outputs the first code word number when a plurality of code block commands and a plurality of control commands of the first code word are received, processed, and stored in a mapped data storage, and outputs the second code word number when a plurality of code block commands and a plurality of control commands of the second code word are received, processed, and stored in the mapped data storage;

a header memory that receives and stores a header of the first code word and a header of the second code word, wherein the header of the first code word includes the first code word number and the first identifier, and the header of the second code word includes the second code word number and the second identifier; and a scheduler connected to the command processor, the layer mapper, and the header memory, for scheduling the first and second code words, wherein the scheduler includes:

a buffer memory that receives and stores the first and second identifiers from the command processor;

a de-multiplexer that receives the first and second code word numbers from the layer mapper, and the first and second identifiers from the header memory, and outputs the first code word number based on the first identifier and the second code word number based on the second identifier;

a set of completion queues including first and second completion queues corresponding to the first and second identifiers, respectively, connected to the de-multiplexer for receiving and storing the first and second code word numbers, wherein the first completion queue stores the first code word number, and the second completion queue stores the second code word number;

a sequence controller connected to the buffer memory for receiving the first and second identifiers, wherein the sequence controller generates first and second select signals corresponding to the first and second identifiers, respectively; and a multiplexer connected to the sequence controller for receiving the first and second select signals, and to the set of completion queues for receiving the first and second code word numbers, wherein the multiplexer outputs one of the first and second code word numbers based on the first and second select signals, and wherein the scheduler schedules the first and second code words based on the one of the first and second identifiers.

10. The radio base station of claim 9, wherein the first completion queue, the second completion queue, and the buffer memory each are first-in-first-out (FIFO) memories.

11. The radio base station of claim 9, wherein the sequence controller is connected to the multiplexer for receiving the one of the first and second code word numbers, and wherein the sequence controller determines first and second count values of the first and second code word numbers, respectively.

12. The radio base station of claim 11, wherein the sequence controller outputs one of the first and second select signals based on the first and second count values.

\* \* \* \* \*